United States Patent [19]

Vaschetto et al.

[11] Patent Number: 5,024,383
[45] Date of Patent: Jun. 18, 1991

[54] VEHICLE WITH A RESERVOIR INCORPORATED IN A STRUCTURAL ELEMENT OF THE VEHICLE BODY

[75] Inventors: Lorenzo Vaschetto, Collegno; Luigi Fazio, Turin, both of Italy

[73] Assignee: 501 Fiat Auto S.P.A., Turin, Italy

[21] Appl. No.: 405,312

[22] Filed: Sep. 11, 1989

[30] Foreign Application Priority Data

Sep. 13, 1988 [IT] Italy .................. 67812 A/88

[51] Int. Cl.⁵ .................. B60R 16/08; B60S 1/46
[52] U.S. Cl. .................. 239/284.1; 296/194
[58] Field of Search .......... 296/194; 239/284.1, 239/284.2; 169/62

[56] References Cited

U.S. PATENT DOCUMENTS

| | | | |
|---|---|---|---|
| 3,738,575 | 6/1973 | Somer | 239/284.1 |
| 3,785,439 | 1/1974 | Britt | 169/62 |
| 3,884,308 | 5/1975 | Green | 169/62 |
| 4,009,622 | 3/1977 | Hinderks | 169/62 X |
| 4,444,358 | 4/1984 | Spohn et al. | 239/284.1 |
| 4,453,895 | 6/1984 | Hauk | 239/284.1 X |
| 4,618,096 | 10/1986 | Kondo et al. | 239/284.1 X |
| 4,893,865 | 1/1990 | McClain et al. | 239/284.1 X |

FOREIGN PATENT DOCUMENTS

| | | |
|---|---|---|
| 2598129 | 11/1987 | France . |
| 2613303 | 11/1988 | France . |
| 2005991 | 5/1979 | United Kingdom . |
| 2116921 | 10/1983 | United Kingdom . |

*Primary Examiner*—David M. Mitchell
*Assistant Examiner*—William Grant
*Attorney, Agent, or Firm*—Shlesinger & Myers

[57] ABSTRACT

A vehicle is described, the body of which comprises at least one cross-member delimiting a vehicle engine or luggage compartment and defined by a box structure which is made fluid-tight to retain a liquid in its interior, and is provided upperly with a filler closed in a fluid-tight manner by a removable stopper, and lowerly with means for withdrawing from the interior of said box structure a liquid contained in it, so that the box structure acts as a storage reservoir for a wash liquid for the vehicle windows.

11 Claims, 2 Drawing Sheets

VEHICLE WITH A RESERVOIR INCORPORATED IN A STRUCTURAL ELEMENT OF THE VEHICLE BODY

BACKGROUND OF THE INVENTION

This invention relates to an improved vehicle, of which a body structural element is formed in such a manner as to define a storage reservoir for a liquid to be used by the vehicle, such as the vehicle window wash liquid.

In current vehicles, the vehicle window was liquid, consisting usually of water with or without the addition of detergents, is normally held in suitable reservoirs housed in the engine compartment (for washing the vehicle windscreen) and, more rarely, in the vehicle luggage compartment (for washing the vehicle rear window), from which the wash liquid is withdrawn under the control of the user, normally by means of electrically driven pumps, and is fed through a suitable hose system to nozzles which spray it onto the windows to be washed.

It is apparent that, especially if the space contained in the vehicle engine compartment or luggage compartment is small, the overall size of such storage reservoirs, which have a volume of at least the order of a liter, reduces the space available for other vehicle mechanical components which may be more important from the point of view of vehicle efficiency or safety, so creating considerable layout problems for the designers during the vehicle design stage, together with considerable maintenance problems in that, because of the space requirements of such window wash liquid storage reservoirs, some components requiring maintenance are sometimes located in nearly inaccessible positions so increasing the manhours required for vehicle maintenance.

SUMMARY OF THE INVENTION

The object of the invention is to provide a vehicle having a body structure which overcomes the obstacle created by the storage reservoir for the vehicle window wash liquid and/or for any other service liquid for the vehicle.

Said object is attained according to the present invention by a vehicle with a body comprising at least one cross-member delimiting a vehicle engine or luggage compartment and at least partly defined by a box structure, characterised in that said box structure is made fluid-tight to retain a liquid in its interior, and is provided upperly with a filler closed in a fluid-tight manner by a removable stopper and lowerly with means for withdrawing from the interior of said box structure a liquid contained in it.

BRIEF DESCRIPTION OF THE DRAWINGS

Further objects and advantages of the invention will be apparent from the description of one embodiment thereof given hereinafter by way of non-limiting example with reference to the accompanying drawings in which.

DETAILED DESCRIPTION OF THE INVENTION

Figure 1:
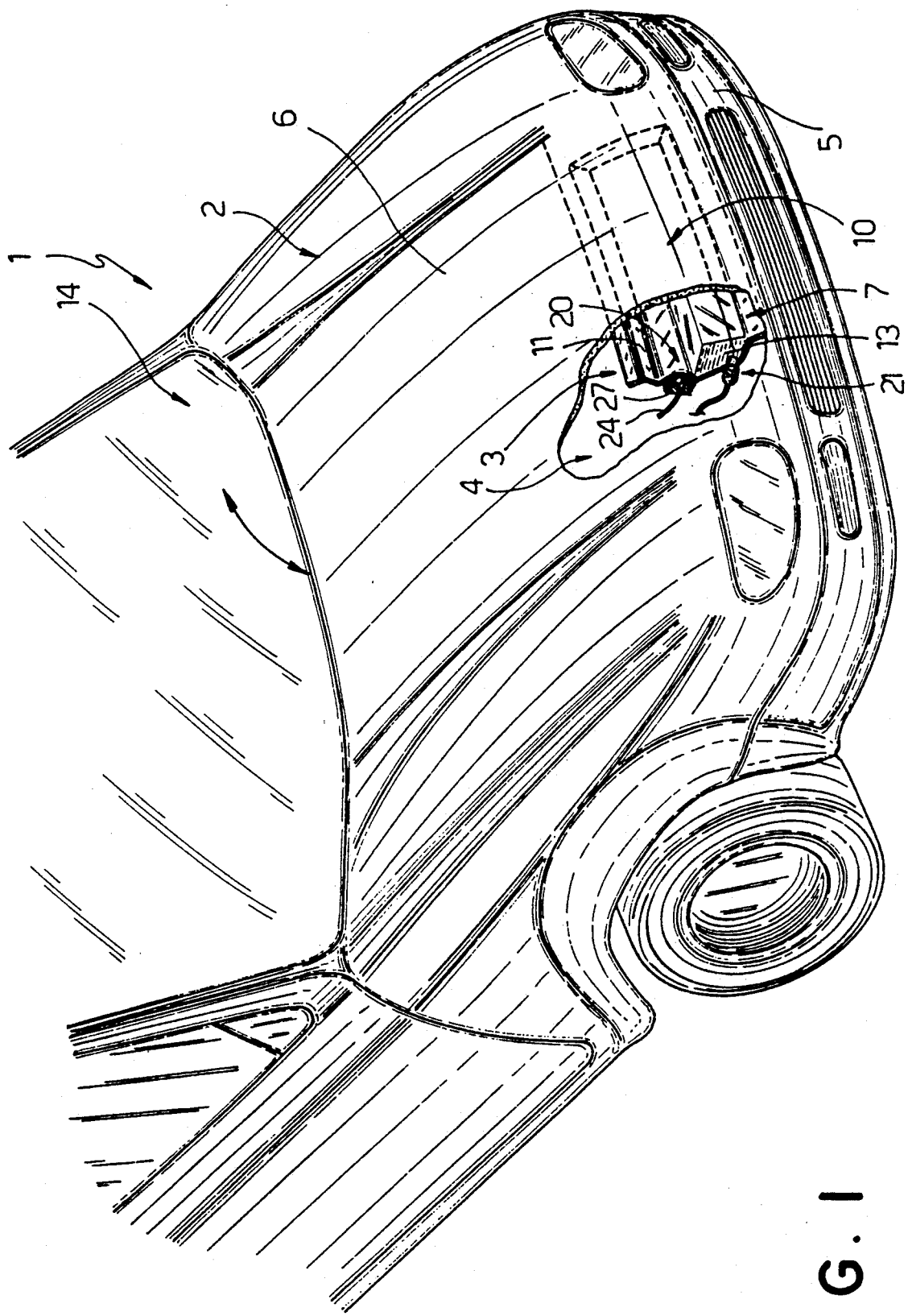
FIG. 1 is a partially cut-away perspective view of a motor vehicle constructed in accordance with the invention and of which only the front part is shown for simplicity.
Figure 2:
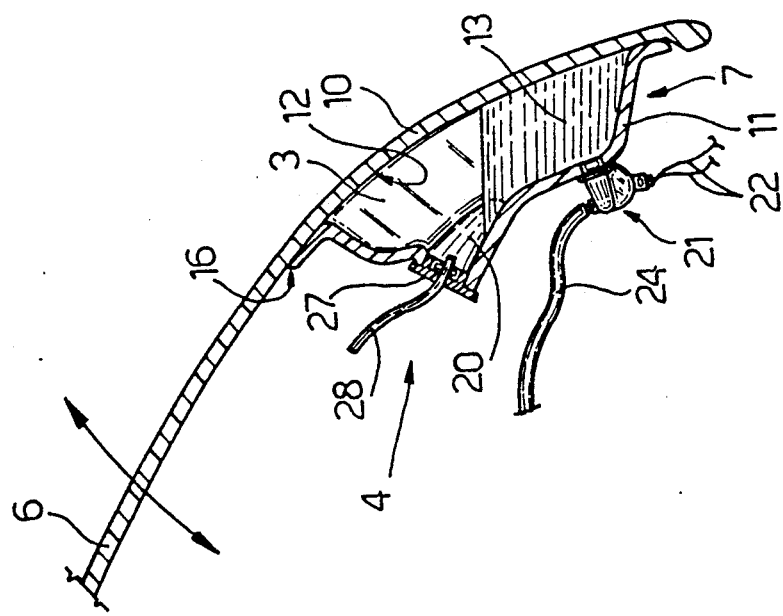
FIG. 2 is an elevational view to an enlarged scale of a detail of the vehicle of FIG. 1.

In FIGS. 1 and 2 the reference numeral 1 indicates overall a vehicle of any known type, such as a motor vehicle, having a body 2 comprising at least one cross-member 3 delimiting, or disposed surrounding, a compartment 4 for the vehicle engine (of known type but not shown for simplicity) and/or for the vehicle user's luggage. In the illustrated non-limiting example, the compartment 4 is the engine compartment of the vehicle 1, provided at its front end, and the cross-member 3 is a front cross-member of the vehicle 1 disposed in immediate proximity to the front bumper 5 thereof and forming a load-bearing structural part of the cover hood 6 for the compartment 4, which is rotatable in the direction of the arrow, for example by being hinged in known manner in correspondence with the bumper 5. According to the invention the cross-member 3 is not solid but instead is formed at least partly as a box structure 7 of substantially known type composed, in this particular example, of an outer element defined by a portion 10 of the hood 6, and a concave inner element 11 of reservoir shape which on its concave side is in contact with and fixed rigidly to the inner surface 12 of the portion 10 of the hood 6.

According to the invention the box structure 7 is made fluid-tight to contain in its interior a liquid 13 consisting preferably of the wash liquid for the vehicle windows, such as the vehicle windscreen 14. A structure 7 possessing this characteristic can be produced in conventional manner by making the elements 6 and 11 of sheet metal and fixing the element 11 to the portion 10 by spot welding, then sealing the joint between the perimetral edge 16 of the element 11 and the portion 10 with suitable sealant, such as silicone sealant, or, as in the illustrated example, by making the hood 6 and the element 11 of plastics or synthetic material, for example of SMC panels, and then fixing the perimetral edge 16 of the element 11 to the portion 10 by adhesives or other continuous fixing methods of thermal welding or ultrasonic type, to join the perimetral edge 16 to the surface 12 in a fluid-tight manner and thus obtain an internally hollow cross-member 3 which is completely sealed in a fluid-tight manner.

To use the box structure 7 constructed in the aforesaid manner as a storage reservoir for the liquid 13, the structure 7 is provided upperly with a filler 20 and lowerly with means for withdrawing the liquid 15 from the interior of the box structure 7 which contains it, and consisting for example of an electrically operated pump 21 of any known type able to be operated by the user from the interior of the vehicle 1 by pulses fed along electric wires 22 and arranged to draw the liquid 13 from the interior of the box structure 7 and feed it against the windscreen 14 (and possibly against the vehicle rear window, of known type and not shown for simplicity), through suitable nozzles of known type not shown for simplicity, by way of at least one hose 24. Both the pump 21 and the filler 20 are preferably carried by the inner element 11, the filler 20 being provided with a removable stopper 27 of any known type able to close the filler 20 in a fluid-tight manner. The filler is preferably provided with a vent device which in the present case consists of a vent hose 28 of suitable length passing through the stopper 27. This latter, by suitably shaping the filler 20, is disposed according to the invention such that the vent hose 28 is always above the maximum level which the liquid 13 can reach within the reservoir defined by the box structure 7, whatever position the hood 6 assumes.

The operation of the described structure is apparent. On the one hand it performs the normal structural function of any box structure forming part of a vehicle body. On the other hand, because of the presence of the stopper 27 of the filler 20, the box structure 7, which in known vehicles remains unused in practice, can here be filled with a liquid such as the wash liquid 13 for the windows of the vehicle 1, and thus act as a storage reservoir for said liquid. When fed into it, the liquid 13 remains therein because in contrast to known vehicles the structure 7 is constructed sealed and fluid-tight, and can be extracted therefrom by the pump 21 when required.

The advantages of the invention are apparent from the description. In practice, the storage reservoir for the window wash liquid is incorporated in the interior of the vehicle load-bearing structure, so completely dispensing with the need to provide space for said reservoir in the interior of the vehicle engine compartment (or luggage compartment), and instead utilizing an interior space within the body which in any case has to be present for structural reasons and which in known vehicles is in no way utilized.

Finally, it is apparent that modifications can be made to the described embodiment but without leaving the scope of the invention. For example, instead of forming part of the load-bearing structure of the vehicle hood, the cross-member in which the wash liquid storage reservoir is provided can form part of any other portion of the vehicle and be disposed in any manner, and the number of pumps for withdrawing said liquid from the interior of the box structure 7 can be increased.

We claim:
1. A vehicle body, comprising:
   (a) load-bearing means forming a portion of the vehicle body and contributing to the overall structure thereof;
   (b) said load-bearing means including reservoir means for containing a fluid therein;
   (c) said load-bearing means including a generally hollow cross-member defining therein said reservoir means; and
   (d) said cross-member being disposed adjacent the front of a vehicle engine compartment and adjacent the front bumper of the vehicle.
2. The vehicle body of claim 1 wherein:
   (a) said reservoir means is substantially fluid-tight and includes first means for filling said reservoir means with the fluid and second means for withdrawing the fluid therefrom.
3. The vehicle body of claim 2, wherein:
   (a) said reservoir means includes top and bottom sections; and
   (b) said first fluid filling means is disposed adjacent said top section of said reservoir means and said second fluid withdrawing means is disposed adjacent said bottom section thereof.
4. The vehicle body of claim 2, wherein:
   (a) said first fluid filling means includes a removable stopper.
5. The vehicle body of claim 4, wherein:
   (a) said stopper includes a vent hose disposed therethrough.
6. The vehicle body of claim 5, wherein:
   (a) said load-bearing means includes a cross-member having an element defined by a portion of the vehicle hood capable of assuming open or close positions; and
   (b) said stopper is disposed in a manner that said vent hose remains above the level of the fluid in said reservoir means regardless of the open or close position of the vehicle hood.
7. The vehicle body of claim 2, wherein:
   (a) said second fluid withdrawing means includes an electrically operated pumping means.
8. The vehicle body of claim 1, wherein:
   (a) said cross-member includes a first element defined by a portion of the vehicle hood and a second element-mounted in a fluid-tight manner to said first element.
9. The vehicle body of claim 8, wherein:
   (a) said first element includes inner and outer surfaces;
   (b) said second element is generally concave in configuration;
   (c) said second element is mounted to said inner surface in a manner that the concavity thereof faces said first element.
10. The vehicle body of claim 1, wherein:
    (a) said cross-member is formed of a plurality of elements; and
    (b) said elements are made from a plastic material and are joined together to form said cross-member.
11. The vehicle body of claim 1, wherein:
    (a) said fluid includes a vehicle window washing liquid.

* * * * *